United States Patent
Ferguson

(10) Patent No.: US 8,960,686 B2
(45) Date of Patent: Feb. 24, 2015

(54) CONTROLLED SURFACE ROUGHNESS IN VACUUM RETENTION

(75) Inventor: Robert A. Ferguson, Beaverton, OR (US)

(73) Assignee: Electro Scientific Industries, Inc., Portland, OR (US)

(*) Notice: Subject to any disclaimer, the term of this patent is extended or adjusted under 35 U.S.C. 154(b) by 583 days.

(21) Appl. No.: 13/250,871

(22) Filed: Sep. 30, 2011

(65) Prior Publication Data

US 2013/0082448 A1    Apr. 4, 2013

(51) Int. Cl.
*H01L 21/683* (2006.01)
*B23Q 3/08* (2006.01)

(52) U.S. Cl.
CPC ............ *B23Q 3/088* (2013.01); *Y10S 414/141* (2013.01)
USPC ............... 279/3; 269/21; 324/750.2; 414/941

(58) Field of Classification Search
CPC .. H01L 21/6838; H01L 21/683; B23Q 3/088; B25B 11/005
USPC ............... 279/3; 269/21; 324/750.2; 414/941
See application file for complete search history.

(56) References Cited

U.S. PATENT DOCUMENTS

| 6,592,671 | B2* | 7/2003 | Sun et al. ............. | 118/625 |
| 7,406,759 | B2* | 8/2008 | Yamamoto et al. ........ | 29/559 |
| 7,557,904 | B2* | 7/2009 | Ohmiya et al. ............ | 355/72 |
| 8,815,015 | B2* | 8/2014 | Kobayashi .............. | 118/721 |
| 2007/0026772 | A1* | 2/2007 | Dolechek et al. ......... | 451/388 |
| 2007/0063453 | A1* | 3/2007 | Ishikawa et al. .......... | 279/3 |
| 2009/0062148 | A1* | 3/2009 | Goldberg et al. ......... | 506/32 |
| 2010/0164155 | A1 | 7/2010 | Segawa et al. | |

FOREIGN PATENT DOCUMENTS

| JP | 02-239621 A | 9/1990 |
| JP | 2000-286329 A | 10/2000 |
| WO | 2008-066804 A1 | 6/2008 |

* cited by examiner

*Primary Examiner* — Eric A Gates
*Assistant Examiner* — Paul M Janeski
(74) *Attorney, Agent, or Firm* — Young Basile Hanlon & MacFarlane P.C.

(57) ABSTRACT

An apparatus, particularly a chuck for retaining a thin part for micro-machining processing, is disclosed. The chuck is formed of a plate-shaped body having a first surface and a second surface opposite the first surface. The plate-shaped body includes a light-transmissive material, and at least one of the first surface or the second surface is a roughened surface. The chuck can be incorporated into a micro-machining system using a chuck support that allows light through to backlight a processed part for inspection.

19 Claims, 3 Drawing Sheets

CONTROLLED SURFACE ROUGHNESS IN VACUUM RETENTION

FIELD OF THE INVENTION

The disclosure relates to the field of processing of thin parts, particularly micro-machining processing of a thin part such as a wafer.

BACKGROUND

While processing thin parts, a chuck can be used to support the part and maintain its position relative to the processing tool. In the case of a wafer and optional tape frame as the part, the thickness is sometimes in the micrometer range, and the part is generally processed by micro-machining in particular using a laser.

BRIEF SUMMARY

Embodiments of a chuck for supporting a part or component for processing and an apparatus for processing the part that incorporates the chuck are disclosed. One example of an apparatus for supporting a part to be micro-machined comprises a chuck formed of a plate-shaped body having a first surface and a second surface opposite the first surface. The plate-shaped body includes a light-transmissive material. At least one of the first surface or the second surface is a roughened surface.

Details of and variations in these embodiments and others are described hereinafter.

BRIEF DESCRIPTION OF THE DRAWINGS

The description herein makes reference to the accompanying drawings wherein like reference numerals refer to like parts throughout the several views, wherein features are not drawn to scale, and wherein.

DETAILED DESCRIPTION

A light-transmissive chuck is desired for retaining certain thin parts during micro-machining because the translucency allows for backlighting. Where the part is a wafer, for example, backlighting is used to inspect micro-machined through features of the processed wafer for quality and accurate placement and/or to align the wafer to the system coordinate system.

Vacuum retention can be used to support a part to be processed against a chuck. When supporting a relatively flat part against a relatively flat chuck surface, the surfaces seal in the presence of a vacuum. This seal would be strongest and instantaneous near any vacuum source portal and may prevent the full evacuation from underneath the part in an acceptable time. Spaced features added to further distribute the vacuum, such as grooves, ports or isolated coplanar pads, are undesirable as such features can be sufficient to pull surface portions of a thin part towards the feature. This would distort the surface of the part, and hence the proper placement, shape, etc., of features machined to form the processed part, particularly when micro-machining is involved. Also, a thin part could be damaged by such pulling.

Desirably, a porous material could be used as a chuck so that a vacuum could be pulled through the entirety of the material. However, available porous materials comprise ceramic and other materials that are not generally translucent.

Figure 1:
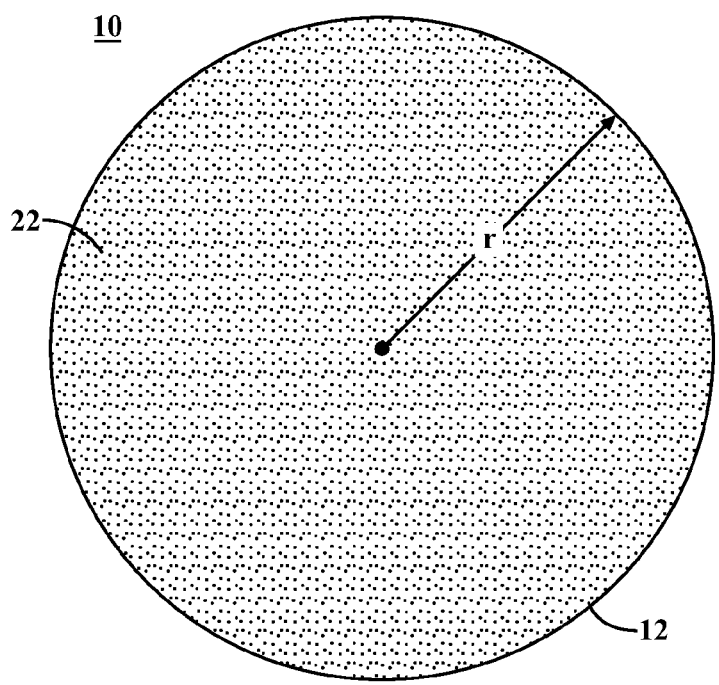
FIG. 1 is a top view of one embodiment of a chuck according to the teachings herein.
Figure 3:
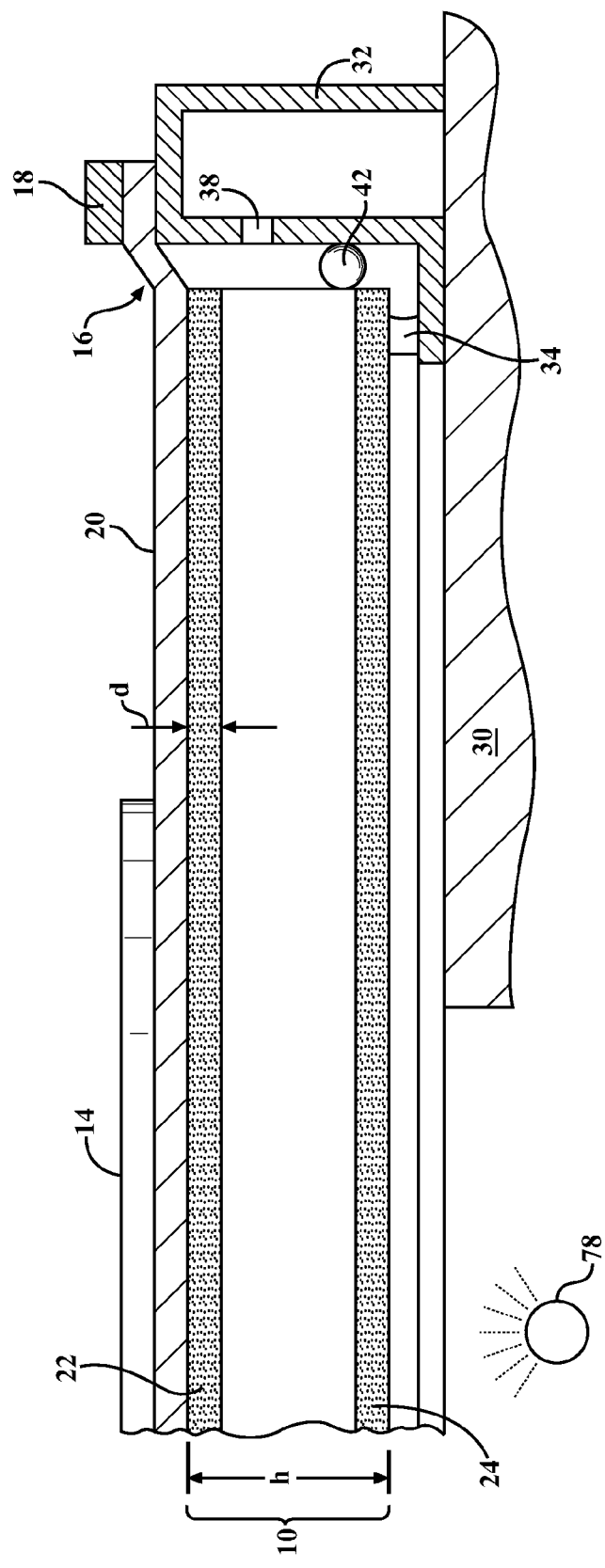
FIG. 3 is a partial side view, partial cross-sectional view of the chuck of FIG. 1 supporting the tape frame and wafer of FIG. 2.

Starting with FIG. 1, a chuck 10 that could be used to retain a thin part using vacuum retention without distorting the part is disclosed. Chuck 10 in this example has a body that is circular with an outer edge 12 defined by a radius r and a substantially uniform thickness h as shown in FIG. 3. In one example, thickness h is 0.500 inches with a tolerance of ±0.005 inches, but thickness h and its variation across chuck 10 can be different based on the thickness and material of the part being processed. Chuck 10 should be significantly thicker than the part being processed so that it is not distorted by the vacuum to be applied and can support the part without distortion. When discussing thin parts herein, generally the part is less than about 100 micrometers (μm), and it is relatively flat at least along its bottom, supported surface. In one embodiment, chuck 10 is used to control flatness below 20 μm.

While chuck 10 is shown as circular in this example, chuck 10 can be of any plate-like shape where its thickness is significantly thinner than its other dimensions. Regardless of its shape, chuck 10 should at least large enough such that its outer edge 12 extends beyond the outer dimensions of the area of the part that is to be backlit. In this example, radius r is about 6.5 inches so as to support a conventional wafer 14 as the part to be processed.

Figure 2:
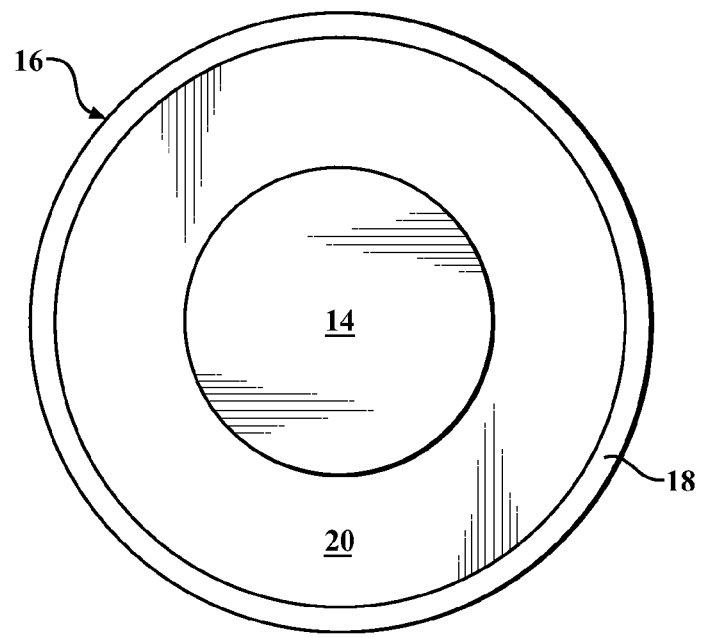
FIG. 2 is a top view of a tape frame and wafer.

As shown in FIG. 2, wafer 14 has a diameter of 100 to 300 mm, but wafers are available in other sizes so wafer 14 is not limited. In many cases, wafer 14 should not be processed without additional support so as to not damage it during movement to and from a processing apparatus. In this example, wafer 14 has a thickness of 25 μm, and wafer 14 is supported by a tape frame 16. Tape frame 16 comprises ring 18, in this case a stainless steel ring, and adhesive tape 20 extending to the edges of ring 18 to removably affix wafer 14. Other ways of supporting wafer 14 are possible.

Referring again to FIG. 1 and also with reference to FIG. 3, chuck 10 is formed of a light-transmissive material, preferably but not necessarily a translucent material. In this case, chuck 10 comprises natural or synthetic fused quartz or fused silica to provide a desired translucency. Herein, these materials are generically called quartz. Other materials are possible as long as they provide light-transmission and sufficient strength to be unaffected by the vacuum. In addition, the material should be substantially homogeneous across the length of chuck 10 (i.e., traveling a path from end to end along the surface direction) so that a relatively uniform amount of light could pass through at any point along the surface. This feature is desirable to reduce variations in imaging due to the material of chuck 10 by allowing relatively uniform backlighting. Accordingly, the material can be substantially homogeneous throughout or could be formed of different materials layered from the top surface to the bottom surface, but could not be layered from end to end unless the materials had similar or the same light-transmissive properties. The quartz materials used in this example can have different levels of quality (e.g. bubble quantity and size). The actual quality of material selected depends on the application.

The surface of chuck 10 upon which the part to be processed lies is a roughened surface 22. Roughened surface 22 desirably extends over the entire supporting surface of chuck 10. FIG. 3 shows by example that the same roughened surface 24 also exists on the surface facing away from the supporting surface of chuck 10 (i.e., the bottom surface). This can be useful by providing a chuck 10 that can merely be turned over when roughened surface 22 becomes damaged from use or otherwise, but it is not necessary.

Roughened surface 22 (and optionally 24) is a fine layer of peaks and valleys that are large enough (i.e., they have a sufficient peak to valley depth and other roughness parameters) to provide paths for vacuum pressure but are small enough not to affect the part to be processed. The translucent material here, quartz, forms these peaks and valleys as pits in the surface of chuck 10. The depth of roughened surface 22 can be obtained experimentally using a test part with the expected strength of the vacuum and depends at least in part on the thickness and material of the part to be processed. In the example, roughened surface 22 extends into the nominal surface of chuck 10 to a depth d of 150-200 micro-inches uniformly over the entire surface. Depth d described herein generally equivalent to a roughness parameter conventionally referred to as peak-peak height (Sz) where the peaks are at the nominal surface of chuck 10 originally at height h.

Roughened surface 22 uniformly covers the surface of chuck 10 with an uneven pattern of peaks and valleys and can be formed by any number of grinding mediums and techniques. Sandpaper or sandblasting can be used. The grit of the sandpaper or the particle sizes, as applicable, should be chosen to provide an appropriate surface as described above. In this case, for example, peak-peak height (Sz) is the roughness parameter specified. However, other amplitude roughness parameters such surface skewness (Ssk) and roughness average (Sa) or functional parameters such as reduced summit height (Spk) and reduced valley depth (Svk) can be measured after testing according to known standards and used to specify roughened surface 22. Whatever the roughness parameters, the resulting roughened surface 22 should not affect the flatness of the thin part when a vacuum is drawn.

FIG. 3 shows chuck 10 supporting tape frame 16 and wafer 14 according to one example of using chuck 10. Chuck 10 is supported on a motion stage 30 described in additional detail hereinafter. More particularly, a chuck support 32 is affixed to motion stage 30 by any number of known techniques, such as gluing, welding, screwing, etc. Chuck support 32 extends annularly about outer edge 12 of chuck 10 and can be made of any material having a suitable strength, such as stainless steel.

A flange at one end of chuck support 32 supports a spacer 34 upon which the bottom surface of chuck 10 rests. Spacer 34 could be annular, but could also comprise a number of spaced apart components having the same height so as to support chuck 10 to present a relatively horizontal surface to tape frame 18 and wafer 14. Spacer 34 preferably comprises a plastic or other material that will fixedly support chuck 10 without damaging the bottom surface of chuck 10, which is roughened surface 24 in this example.

Chuck support 32 extends vertically and then provides a generally horizontal surface or ledge upon which adhesive tape 20 and the bottom surface of ring 18 rests. Chuck support 32 then extends in a leg portion to motion stage 30. As shown, ring 18 is higher than roughened surface 22 of chuck 10 so that adhesive tape 20 is drawn down toward chuck 22 when a vacuum is drawn. Tape frame 16 is arranged in one example such that adhesive tape 20 is 0.5-1 mm higher than the top of roughened surface 22. In some embodiments, tape frame 16 rests on the ledge of chuck support 32 and is maintained in position by the vacuum force and weight of ring 18. In other embodiments, tape frame 16 is conventionally clamped to chuck support 32.

Figure 4:
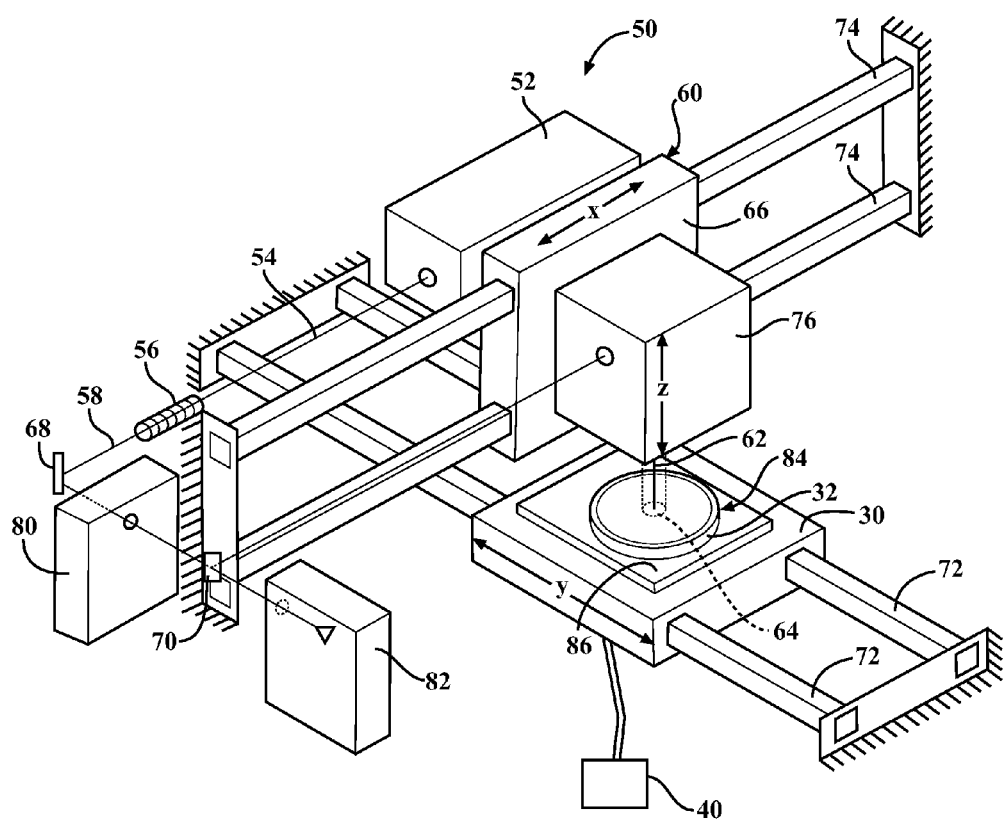
FIG. 4 is a schematic view of one example of a micro-machining system incorporating the chuck of FIG. 1.

A plurality of vacuum ports 38 extends through the inner wall formed by chuck support 32. Vacuum ports 38 can be, but are not necessarily, distributed evenly about chuck support 32, and each is pneumatically coupled to a vacuum source 40 (FIG. 4). Vacuum source 40 can provide a vacuum through vacuum piping extending through motion stage 30. So that vacuum ports 38 can pull a vacuum along roughened surface 22, an O-ring 42 is wedged between chuck 10 and chuck support 32 to form a seal. In this way, chuck support 32 is also called a vacuum chuck base herein. O-ring 42 can be omitted if spacer 34 is an annular seal.

As mentioned, chuck 10 is supported on motion stage 30. FIG. 4 shows motion stage 30 as part of a micro-machining system or apparatus 50. Apparatus 50 is, more particularly, a laser processing system. Details of tape frame 16, chuck 10, wafer 14 and their chuck support 32 shown in FIGS. 1-3 are omitted in FIG. 4 for clarity.

Micro-machining system 50 as shown includes a laser 52 that provides a laser output 54 of one or more laser pulses at a predetermined wavelength and spatial mode profile. Laser output 54 can be passed through a variety of well-known expansion and/or collimation optics 56, propagated along an optical path 58 and directed by a beam positioning system 60 to impinge laser system output pulse(s) 62 on a laser target position 64 on wafer 14. Beam positioning system 60 can include a translation stage positioner that employs at least one stage 66 transverse to motion stage 30. Stages 30 and 66 support, for example, X, Y and/or Z positioning minors 68 and 70. Beam positioning system 60 can permit quick movement between target positions 64 on wafer 14.

Stages 30 and 66 can move the beam positioning system 60 and wafer 30 along trajectories relative to each other to form features in wafer 14. As shown in the example of FIG. 4, the translation stage positioner is a split-axis system where Y motion stage 30, typically moved by linear motors along rails 72, supports and moves chuck support 32, chuck 30, tape frame 16 and wafer 14, and X stage 66, typically moved by linear motors along rails 74, supports and moves a fast positioner 76 that in turn supports a focusing lens freely movable along the illustrated Z-axis according to a number of known methods.

Still referring to FIG. 4, a positioning minor (not shown) is mounted within the housing of fast positioner 76 to direct output pulse(s) 62 along the illustrated Z-axis through the focusing lens to the laser target position 64. The Z dimension between X stage 66 and Y stage 30 may also be adjustable. Positioning minors 68 and 70 align optical path 54 through any turns between laser 52 and fast positioner 76, which is positioned along optical path 54. Fast positioner 76 may, for example, employ high resolution linear motors or a pair of galvanometer mirrors that can effect unique or repetitive processing operations based on provided test or design data. Stages 30 and 66 and positioner 76 can be controlled and moved independently or coordinated to move together in response to panelized or unpanelized data. Note that one of stage 30 or stage 66 could be fixed while the other moves in both the X- and Y-directions.

Fast positioner 76 can also include a vision system that can be aligned to one or more fiducials on the surface of wafer 14. Beam positioning system 60 can employ vision or beam alignment systems that work through an objective lens or are off axis with a separate camera. In this way, imaging of features machined through wafer 14 can be performed while a light source 78 (FIG. 3) is positioned beneath chuck 10 to backlight wafer 14.

An optional laser power controller 80, such as a half wave plate polarizer, may be positioned along optical path 54. In addition, one or more beam detection devices 82, such as photodiodes, may be downstream of laser power controller 80, such as aligned with positioning mirror 70 that is adapted to be partly transmissive to the wavelength of laser output 62. Beam detection devices 82 are preferably in communication with beam diagnostic electronics that convey signals to modify the effects of laser power controller 80.

Wafer 14 and tape frame 16 are supported by a chuck assembly 84, which includes vacuum chuck base or chuck support 32, chuck or chuck top 10 as shown in more detail in FIG. 3 and an optional plate 86 in which light source 78 is mounted. Plate 86 is easily connected to and disengaged from stage 30. Chuck support 32 may alternatively be adapted to be secured directly to stage 30 such that light shines through an aperture of stage 30 as shown in FIG. 3. Vacuum source 40 is coupled to chuck support 32 as previously described.

Micro-machining system 50, including movement of its stages 30, 66, the pressure provided by vacuum source 40, etc., can be controlled by a computer and/or special-purpose controller (not shown) including one or more toolpath files for performing the desired processing of wafer 14.

FIG. 4 shows only one example of a micro-machining system 50 that can incorporate chuck 10. Other systems 50 can be used. Laser micro-machining systems from Electro Scientific Industries, Inc. of Portland, Oreg. and sold as Model Nos. 5330, 5530 and 5800, for example, can incorporate chuck 10. In addition, chuck 10 can be used in other micro-machining systems not limited to laser micro-machining systems.

In operation, chuck 10 is placed in chuck support 32 on spacer(s) 34. Then, O-ring 42 is placed to bound an end of the vacuum chamber that seals the part to be processed to roughened surface 22 and is formed by tape frame 16, chuck 10, chuck support 32 and O-ring 42. The part is moved to lie on roughened surface 22 of chuck 14 and is clamped to bound another end of the vacuum chamber. Here, tape frame 16 upon which wafer 14 is supported is moved to lie on chuck support 32, and ring 18 is optionally clamped to chuck support 32. Vacuum source 40 is coupled to vacuum ports 38, and a vacuum is applied to draw tape 20 to wafer 14 to seal tape 20 and wafer 14 to roughened surface 22 for processing of wafer 14. The seal is tight and relatively uniform over the bottom surface of wafer 14. After micro-machining wafer 14, a camera can be used to image the through features with the aid of backlighting provided by light source 78. In addition to providing a surface that speeds the application of a vacuum while maintaining the flatness of the thin part to be processed, roughened surface 22 provides the additional benefit of diffusing light source 78 so as to provide additional light uniformity under the processed part so that comparisons can be more accurately made between through features.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus for supporting a part to be micro-machined, comprising:
   a chuck formed of a plate-shaped body having a first surface that is flat for supporting a flat bottom surface of the part, a second surface opposite the first surface, and an outer edge extending between the first surface and the second surface, the plate-shaped body formed of a light-transmissive material and the first surface being a roughened surface;
   a chuck support supporting the chuck on a stage of the apparatus, the chuck support having an inner peripheral wall extending about the outer peripheral edge of the chuck to form a vacuum chamber between the inner peripheral wall of the chuck support and the outer peripheral edge of the chuck;
   at least one vacuum port in pneumatic communication with the roughened surface through the vacuum chamber; and
   a vacuum source pneumatically coupled to the at least one vacuum port so as to draw a vacuum pressure through the at least one vacuum port, the vacuum chamber and paths formed in the roughened surface to draw the flat bottom surface of the part to the roughened surface.

2. The apparatus of claim 1 wherein the light-transmissive material is translucent.

3. The apparatus of claim 1 wherein the light-transmissive material comprises at least one of a natural or a synthetic fused quartz or fused silica.

4. The apparatus of claim 1 wherein the light-transmissive material is substantially homogeneous so as to provide relatively uniform passage of light from the first surface to the second surface at any point along the first surface.

5. The apparatus of claim 1 wherein the roughened surface extends for the entirety of the first surface and the second surface.

6. The apparatus of claim 1 wherein the plate-like shape forms a circle.

7. The apparatus of claim 6 wherein a radius of the circle is about 6.5 inches.

8. The apparatus of claim 1 wherein the plate-like shape has a relatively uniform thickness.

9. The apparatus of claim 8 wherein the relatively uniform thickness is 0.500±0.005 inches.

10. The apparatus of claim 9 wherein the roughened surface has a depth of 150-200 micro-inches.

11. The apparatus of claim 1 wherein the roughened surface provides a path for application of vacuum pressure but is fine enough so that the part is not distorted by the application of vacuum pressure.

12. The apparatus of claim 1, further comprising:
   an O-ring sealing the outer edge of the chuck against an inner wall of the chuck support to form a seal for the vacuum chamber.

13. The apparatus of claim 1, further comprising:
   a light source positioned to emit light through the chuck support to reach the chuck.

14. The apparatus of claim 1 wherein the at least one vacuum port extends through a wall of the chuck support and into the vacuum chamber.

15. The apparatus of claim 14 wherein the at least one vacuum port comprises a plurality of vacuum ports extending through the inner wall of the chuck support and distributed about the chuck support.

16. The apparatus of claim 1 wherein the part is a wafer supported by a tape frame, the tape frame is supported on the chuck support, and the vacuum chamber is formed by the chuck support, a seal sealing the chuck against a wall of the chuck support, and tape of the tape frame.

17. The apparatus of claim 1, further comprising:
   an annular seal sealing the bottom surface of chuck against a surface of the chuck support to form a seal for the vacuum chamber.

18. The apparatus of claim 1, further comprising:
a light source positioned beneath the chuck to backlight the part.

19. An apparatus for supporting a part to be micro-machined, comprising:
- a chuck formed of a plate-shaped body having a first surface that is flat for supporting a flat bottom surface of the part, a second surface opposite the first surface, and an outer edge extending between the first surface and the second surface, the plate-shaped body formed of a light-transmissive material and the first surface being a roughened surface;
- a chuck support supporting the chuck on a stage of the apparatus, the chuck support having an inner wall extending about the outer edge of the chuck to form a vacuum chamber between the chuck support and the chuck;
- at least one vacuum port in pneumatic communication with the roughened surface through the vacuum chamber between the chuck support and the chuck; and
- a vacuum source pneumatically coupled to the at least one vacuum port;
wherein the second surface is also a roughened surface.

* * * * *